Oct. 5, 1965　　M. V. JORGENSEN ET AL　　3,210,584
SYNCHRONOUS INDUCTION MACHINE
Filed April 20, 1961　　　　　　　　　　　　　　4 Sheets-Sheet 1

INVENTORS
MICHAEL V. JORGENSEN, BRUCE E. ALBERTSON,
BY　EDWARD J. MICHAELS & GEORGE E. TURNER

ATTYS.

Oct. 5, 1965 M. V. JORGENSEN ETAL 3,210,584
SYNCHRONOUS INDUCTION MACHINE
Filed April 20, 1961 4 Sheets-Sheet 2
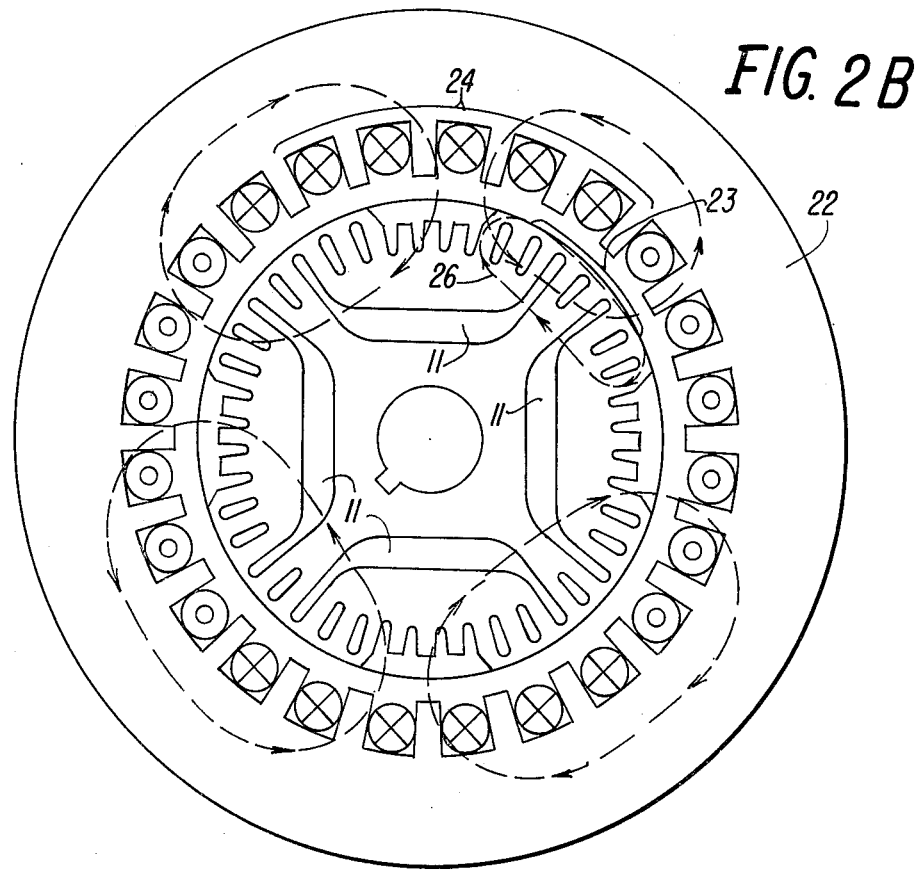
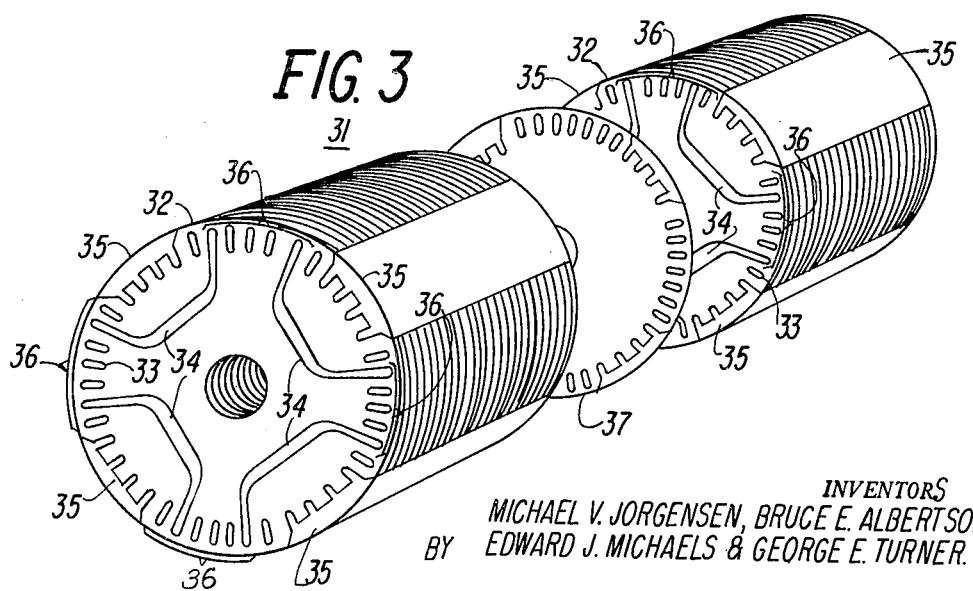
INVENTORS
MICHAEL V. JORGENSEN, BRUCE E. ALBERTSON,
EDWARD J. MICHAELS & GEORGE E. TURNER.
BY
ATTYS.

INVENTORS
MICHAEL V. JORGENSEN, BRUCE E. ALBERTSON,
EDWARD J. MICHAELS & GEORGE E. TURNER.
By Byron, Hume, Groen & Clement.
Attys.

Oct. 5, 1965   M. V. JORGENSEN ETAL   3,210,584
SYNCHRONOUS INDUCTION MACHINE
Filed April 20, 1961   4 Sheets-Sheet 4

INVENTORS
MICHAEL V. JORGENSEN, BRUCE E. ALBERTSON,
EDWARD J. MICHAELS & GEORGE E. TURNER.
BY
ATTYS.

United States Patent Office 3,210,584
Patented Oct. 5, 1965

3,210,584
SYNCHRONOUS INDUCTION MACHINE
Michael V. Jorgensen, Milwaukee, Bruce E. Albertson, Greendale, and Edward J. Michaels and George E. Turner, Milwaukee, Wis., assignors to The Louis Allis Company, Milwaukee, Wis., a corporation
Filed Apr. 20, 1961, Ser. No. 104,370
4 Claims. (Cl. 310—265)

This invention relates to induction motors of the synchronous type and more particularly to a rotor design for improving the performance characteristics of such motors.

Synchronous induction motors, such as the motor described in the Douglas et al. patent, U.S. No. 2,913,607 issued on November 17, 1959, are designed to rotate at a constant speed. In this respect they differ from ordinary induction motors wherein speed varies with motor load. Constant speed operation, at the synchronous speed of the stator field, is obtained by limiting the number of paths in the rotor through which the stator flux may pass instead of providing an infinite number of rotor paths as in an ordinary induction motor. Limiting the flux paths in the rotor forms salient poles in the rotor equal in number to the poles of the stator. By restricting the flux paths in a synchronous rotor, the rotor poles are effectively prevented from shifting or slipping with respect to the rotating stator poles.

When starting, the synchronous induction motor accelerates and approaches synchronous speed by induction motor action due to the squirrel cage winding on the periphery of the rotor. As near synchronous speed is attained, the motor experiences oscillations in speed not unlike those of a direct-current excited synchronous machine. The oscillations are the result of variations in reluctance among the periphery of the rotor due to the limited number of flux paths. As the motor continues to accelerate, rotor speed will have occasion to oscillate above the synchronous speed of the field. At this point, the rotor "locks in," the oscillations cease, and the rotor remains at synchronous speed. Once "locked in" the rotor will maintain a constant speed from no load to full load and during intermittent overloads.

However, the constant speed synchronous induction machine is subject to speed instability under certain conditions. This instability takes the form of repetitive equal and opposite variations in motor speed or speed oscillations. Unstable operating conditions include operation at low frequency, low voltage, high stator winding resistance, light load, unbalanced voltage or unbalanced stator windings. Since varying the applied frequency provides a simple means for controlling the speed of a synchronous induction motor, instability of the motor when operating at low frequency is the most acute of the above mentioned cases of instability. Low frequency instability effectively limits the lowest speed at which a synchronous machine may be operated.

The above described instability is particularly troublesome in applications requiring a wide range constant speed, as for example, textile spinning drives where the characteristics of the thread or filament being spun are dependent directly on drive motor speed. It is, therefore, to the solution of the problem of low frequency instability of synchronous induction motors that the invention claimed in this patent is primarily directed.

The primary object of this invention is to provide speed stability to constant speed synchronous induction motors.

It is another object of this invention to provide constant speed synchronous motors capable of operation at low frequencies.

It is a further object of this invention to increase the pull-in torque, or the ability to attain synchronous speed under load, of such machines.

Another object is to provide this stable, high pull-in torque motor with little reduction in other favorable operating characteristics of the synchronous induction machine.

In addition, it is an object of this invention to provide this motor in a manner such that it is easy to manufacture and such that it can be produced on existing equipment designed for production of ordinary induction motors without modification or alteration of such equipment.

It is a further object of this invention to provide simple means for ensuring the stable operation of synchronous induction motors at low frequencies.

It is yet another object of this invention to provide means having their maximum effect during periods of instability to produce a force tending to stabilize the operation of synchronous induction motors.

Briefly, the invention is directed to the problem of providing speed stability to a constant speed synchronous induction machine. Means are provided to introduce a stabilizing force whenever the stator and rotor poles move relative to one another. This stabilizing force acts in opposition to the forces causing the relative movement of the stator and rotor poles. More specifically, flux paths of closely controlled permeance are specifically provided to increase the number of paths in the rotor through which stator flux may pass. Specific means of effectively and simply providing this stabilizing force are illustrated and described.

Further advantages, features and objects and the manner in which they are achieved may be better understood by reference to the following drawings and detailed explanation.

In the drawings:

FIGURES 2A and 2B depict the problem of motor instability which is substantially eliminated when employing the rotor structures of the present invention;

FIGURE 3 is a perspective partially exploded view of an improved synchronous induction motor rotor showing one structure for obtaining low speed stability;

Figure 1:
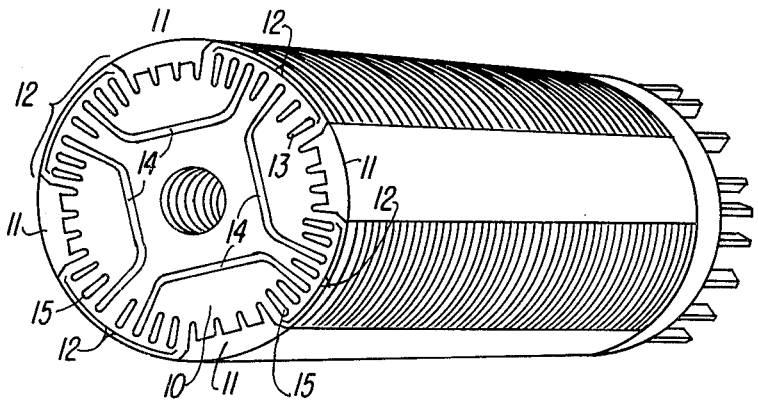
FIGURE 1 is a perspective view of a synchronous induction motor rotor of the prior art wherein successive laminations are stacked one upon the other in an orderly symmetrical pattern.
Figure 2A:
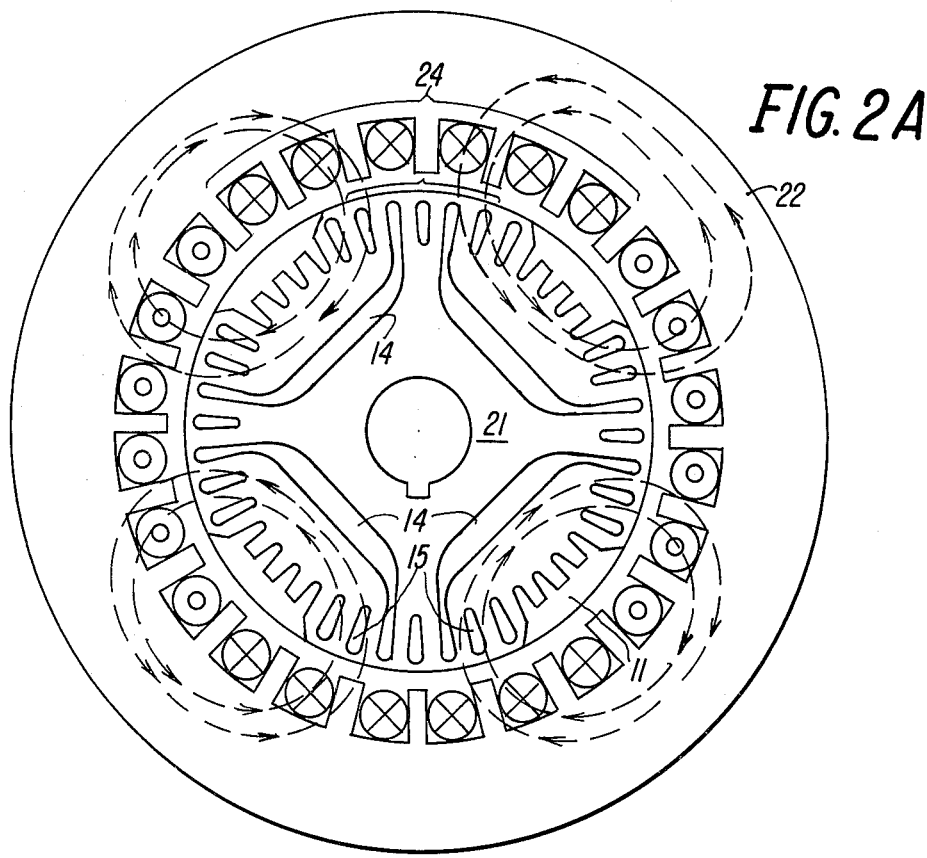

Referring now to the drawings, a prior art rotor is illustrated in FIGURE 1 and it is comprised of a stack of rotor barrier laminations 10 secured together by any convenient means and each lamination 10 comprises a plurality of punched holes 15 adapted to provide a squirrel cage winding, internal flux barrier 14 and cooperating flux guiding segments 11. The function of the internal flux barriers 14 and the cooperating flux guiding segments 11 is to force the flux into predetermined paths as illustrated in FIGURES 2A and 2B, thereby enabling an induction motor to operate as a synchronous type motor. The plurality of rotor barrier laminations 10 are congruently and symmetrically stacked one upon the other so as to restrict the flux formed by the plurality of flux barrier 14 and flux guiding segments 11 into identical paths.

For a standard prior art 4 pole, 140 frame synchronous induction machine, the rotor of which is illustrated in FIGURE 1, it was observed that the speed oscillation began when the applied frequency was reduced to 35 cycles per second and continued as the frequency was further reduced. The motor completed a maximum of 10 oscillations per second; the maximum variation from synchronous speed being equivalent to approximately 10 revolutions per minute. It was further found that the oscillations were not a simple harmonic or subharmonic of the line frequency.

The rotor oscillations are initiated by any small disturbing forces on the rotor including stray harmonic impulses or impulses induced by the rotor passing the stator slots. These oscillations continue to a minor degree even after the rotor is locked in synchronism and at low frequencies may be sufficient to cause the motor instability.

A heavy external load on the motor or high bearing friction will tend to reduce the oscillations. However, mechanical damping of this nature is seldom able to produce a stable low frequency motor.

In most induction motors, electrical damping is provided by the armature reaction. The effective analysis of armature reaction damping will be aided by reference to FIGURES 2A and 2B. Since in a synchronous induction machine the stator field and the rotor are revolving at the same speed, these two elements can be viewed as stationary and only the relative rotation between the rotor and the stator considered. Thus, FIGURE 2A shows rotor 21 in synchronization with stator 22, with aligned rotor poles 23 of rotor 21 and stator poles 24 of stator 22 revolving at synchronous speed. In FIGURE 2B, the motor is unstable and undergoing oscillations. The speed of rotor 21 has increased so that rotor poles 23 and stator poles 24 are no longer aligned, rotor poles 23 precede stator poles 24 by half a pole width. To complete the oscillation, rotor poles 23 which have reached the position shown in FIGURE 2B, decrease in speed and swing back across the face of the stator poles 24 so that rotor poles 23 lag stator poles 24 by half a pole width. In unstable operation, the rotor will continue to periodically pass across the face of the stator poles 24 from one extreme to the other. The rotor 21, even though oscillating will not rotate to the extent that the rotor poles 23 will line up with stator poles 24 different from the ones they were originally aligned with, since "pole slipping" would remove the rotor from synchronization.

As the rotor 21 oscillates with respect to its central or "locked in" position with the stator 22, it passes through a portion of the stator flux. This generates a current in the rotor 21 producing a flux 26 and force in a direction to oppose the oscillation. This armature reaction would normally tend to dampen the rotor oscillation. However in prior art synchronous induction motors, the armature reaction is very slight since the path of the flux produced by the induced current in the squirrel cage windings is interrupted by the flux barriers 11. Prior art synchronous motors, therefore, have insufficient electrical or mechanical damping to halt the oscillations once they have been initiated.

Even without mechanical or electrical damping, it might be possible for the oscillations to cease were it not for forces tending to sustain the oscillations. In most synchronous induction motor applications as the frequency is decreased, the applied voltage is also decreased to maintain constant motor flux and constant motor operating characteristics. In this circumstance, the effective resistance of the stator, that is, the magnitude of the stator resistance as compared to the magnitude of the stator voltage increases since stator resistance remains constant as stator voltage decreases. Periodic relative rotation of the rotor under conditions of low stator voltage, low armature reaction, and high effective stator resistance produces a periodic counter E.M.F. in opposition to the stator voltage. As the stator voltage is low, the counter E.M.F. can substantially change the magnitude of the stator voltage. The result is a pulsating stator voltage obtained by the difference between the applied stator voltage and the periodic counter E.M.F. Since the impedance of the stator is mainly resistive due to decreased applied frequency, the pulsating voltage and corresponding flux are in a phase relationship effective to sustain the oscillations.

The above phenomenon does not occur if any one of the condition of low stator voltage, high effective stator resistance or low armature reaction is absent. If the applied stator voltage is high, the pulsating voltage in the stator will be prevented by the overwhelmingly high voltage supplied to the stator by the line. Low effective stator resistance signifies high stator voltage and frequencies. Increased stator reactance accompanies increased frequency. With high stator reactance, any voltage pulsations are 90° out of phase and tend to damp rather than prolong the oscillations. High armature reaction increases the damping effect of the squirrel cage rotor windings.

Since it is usually not compatible with operating conditions to increase the stator voltage or to decrease the effective stator resistance, the practical solution lies in improving the damping effect of the armature reaction. To increase the armature reaction, it is necessary to provide a controlled magnetic circuit across the magnetic flux barriers 11 of the rotor. An effective means for providing this circuit is to provide selective gaps in the barriers between the salient poles of the rotor to thereby allow a controlled cross polar flux to develop.

Several rotor structures may be employed which restrict the flux paths between the stator and the rotor so as to effectively form salient poles in the rotor equal in number to the number of poles in the stator so as to cause the motor to operate as a synchronous induction motor and, which at the same time provide effective flux paths across these adjacent salient poles that enable a strong armature reaction to occur whenever there is relative movement between the poles on the rotor and the poles on the stator.

One such structure is shown in FIGURE 3 and comprises the interleaving in a stack of rotor barrier laminations, blank laminations containing no flux barriers. The numeral 31 indicates generally a synchronous induction motor rotor comprised of stacked rotor laminations 32. Laminations 32 are punched to provide squirrel cage winding 33, internal flux barriers 34, and flux guiding segments 35. The latter two elements provide salient poles 36. Blank lamination 37 contains no internal flux barriers 34. Blank laminations 37 may be interleaved with laminations 32 to provide a cross-polar path for the armature reaction flux.

It has been observed that when between 5 to 15% of the total number of laminations of the rotor illustrated in FIGURE 3 are the blank laminations 37 that, excellent results were provided. Also, if desirable, blank laminations, without the flux guiding segments 35, may be used in the place of the blank laminations 37 shown in FIGURE 3.

Figure 4B:
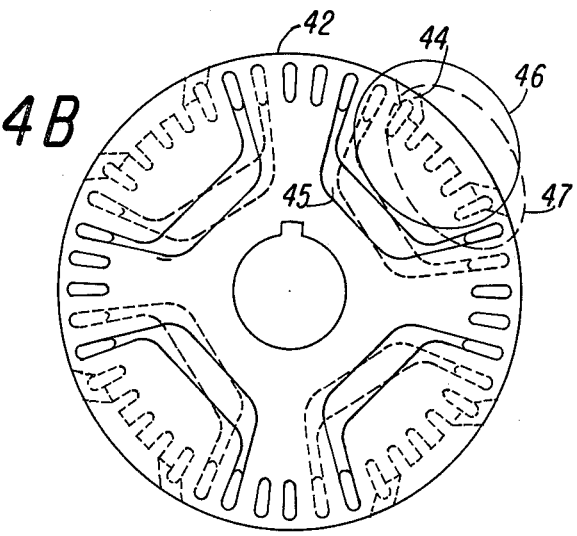
FIGURE 4B is a detailed view illustrating the method employed in forming the rotor illustrated in FIGURE 4A.
Figure 4A:
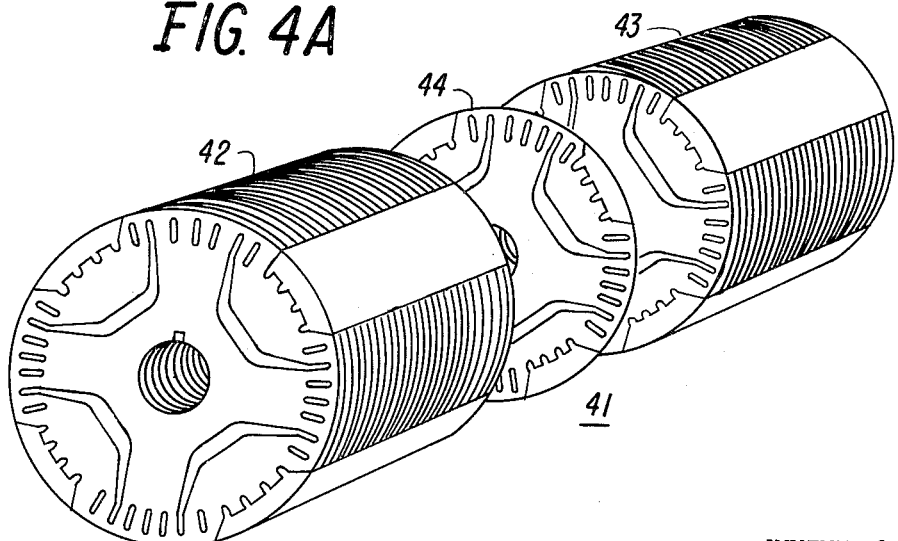
FIGURE 4A is a sectional view of another improved rotor demonstrating another structure for improving the performance of synchronous induction machines.

Another structure, simpler than the above, is shown on FIGURES 4A and 4B. This structure utilizes only standard barrier laminations such as shown in FIGURE 3, and the majority of laminations in the stack are longitudinally aligned. However, 5 to 15% of laminations in the stack are individually displaced by angular rotation from longitudinal alignment to provide cross barrier flux paths. A synchronous induction motor rotor of this construction is indicated by the numeral 41. Two aligned stacks of standard rotor laminations 42 and 43, such as illustrated in FIGURE 3, are separated by lamination 44 and which is rotated forward one winding slot. The cross barrier flux path 47 formed by the rotation of lamination 44 may be seen from FIGURE 4B. The magnetic flux path 46 formed by the internal flux barriers 45 of aligned rotor lamination 42 is short circuited by the cross barrier flux path 47 of the offset or rotated lamination 44. Rotation in the amount of one or two squirrel cage winding slots provides sufficient cross-polar flux for stability yet does not decrease the action of the magnetic flux barriers 45 to the point where motor performance is affected.

Figure 5:
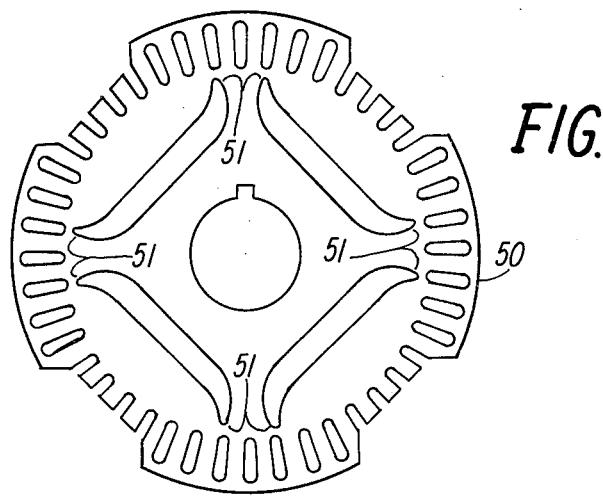
FIGURE 5 shows a unique lamination for another improved synchronous induction motor rotor configuration.

A rotor lamination of the design shown in FIGURE 5 may also be used to accomplish the same object as the above structures. Narrow bridge 51 in lamination 50 forms a cross-polar flux path. Bridge 51 saturates at a low level of magnetic flux thus limiting the amount of the cross-polar leakage. By making bridge 51 narrow, bridged laminations may be used throughout the rotor without excessive flux leakage. If the width of bridge 51 is increased the number of bridged laminations used must be decreased to prevent the cross-polar flux from becoming too great.

By constructing the internal flux barriers of the rotor of a material of moderate magnetic permeability a path for the armature reaction may be created without otherwise changing the lamination design. Possible materials for use as a modified flux barrier includes stainless steel, stintered powdered iron, a mixture of iron fillings and aluminum, and various iron-aluminum alloys. The magnetic properties of the first two materials include a magnetic permeability greater than that of aluminum, the material normally used for flux barriers but not so great as to interfere with the action of the flux barriers in producing a synchronous speed motor. Flux barriers of stainless steel and powdered iron are characterized by a permeability of about 100 to 300, compared with 1 for aluminum and approximately 3000 for the lamination steel itself. Aluminum, iron mixtures and alloys should be designed for the same permeability.

Figure 6:
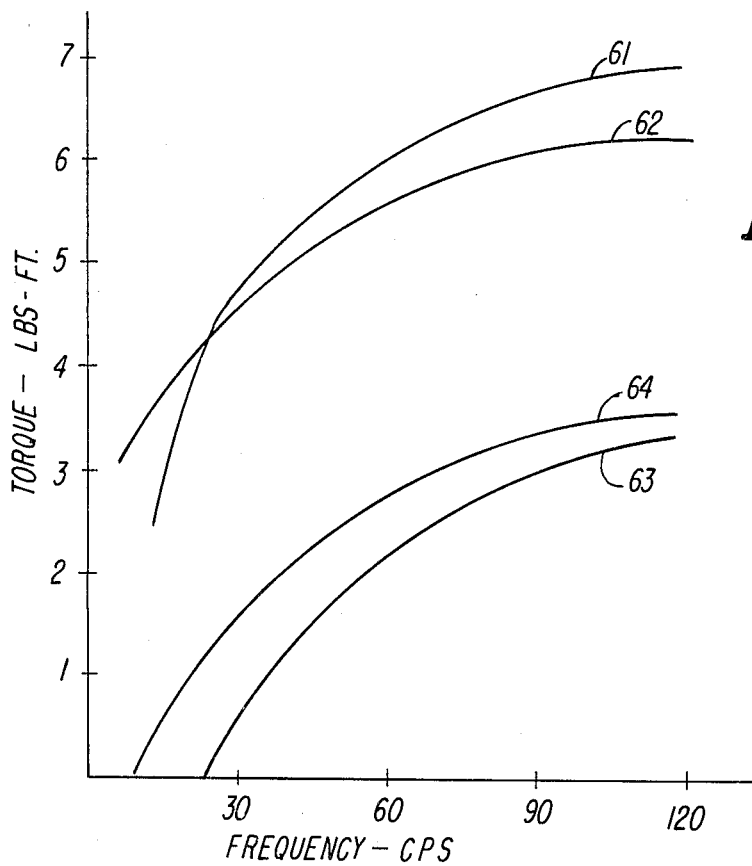
FIGURE 6 is a graph of the operating characteristics of a prior art synchronous induction motor and an improved synchronous induction motor made in accordance with the teachings of this invention.

The effect of increasing the armature reaction on other performance characteristics of a snchronous induction motor is illustrated in FIGURE 6 wherein the performance characteristics of a 4 pole, 140 frame synchro-nous induction motor of a prior art manufacture and a 4 pole, 140 frame improved synchronous induction motor assembled in accordance with the teachings of this invention are shown. The stator of both motors were identical and both motors were provided with rotors of the same type laminations. The laminations were of the type shown in FIGURES 4A and 4B. The laminations of the prior art motor were longitudinally aligned. Every tenth rotor lamination of the improved rotor was, however, rotated one winding slot out of longitudinal alignment. In FIGURE 6 applied frequency in cycles per second on the horizontal axis is plotted against motor torque in pound-feet on the vertical axis. Structures made in accordance with the teachings of this invention providing the effective rotor cross polar-flux are slightly less efficient in the utilization of stator flux than prior art motors thus causing a minor reduction in the ability of the motor to hold a load at synchronous speed.

As an example, the maximum torque a synchronous induction motor can produce and still remain at synchronous speed is defined as pull-out torque. FIGURE 6 illustrates the pull-out torque versus frequency curve 61 of the sampled prior art motor and the pull-out torque versus frequency curve 62 of the sampled improved motor. The pull-out torque of the sampled prior art motor exceeds the pull-out of the sampled improved motor torque in its normal operating range i.e. over 30 cycles per second. Beyond that point, the pull-out torque of the sampled prior art motor drops off abruptly due to motor instability. The pull-out torque of the sampled improved motor exceed the pull-out torque of the sampled prior art motor below 30 cycles per second and is stable to 8 or less cycles per second.

Pull-in torque, or the ability of the motor to bring a load to synchronous speed, is increased through the use of the improved motor. The pull-in torque versus frequency relationship of the prior art synchronous motor and the pull-in torque versus frequency relationship of the improved synchronous motor under the same load are shown by curves 63 and 64, respectively. The greater pull-in torque of the improved motor may readily be seen. In addition, therefore, to providing previously unattainable speed stability in a synchronous induction motor, a synchronous induction motor made in accordance with the teachings of this invention also permits increased motor loading due to the higher pull-in torque.

What has been described is what is considered at this time to be the preferred embodiments of the invention. However, it should be realized that embodiment of the invention differing from the disclosed embodiments can be made and as such are within the true inventive scope of the invention and it is intended that these be covered in the appended claims.

What is claimed is:

1. A rotor for use in a synchronous induction machine comprising a plurality of stacked laminations secured in a unitary relationship, said stacked laminations having peripheral slots formed therein to enable said machine to possess slip characteristics below synchronous speed, a plurality of pole defining magnetic flux barriers provided in said stacked laminations traversing said flux barriers, said pole defining flux barriers comprising magnetic flux barriers of a material of moderate magnetic permeability of 100 to 300 as compared to aluminum to thereby establish poles in said rotor and at the same time establish cross-polar flux paths to increase armature reaction for speed stabilization of said synchronous induction machine.

2. A rotor adapted for use in a synchronous induction machine comprising a plurality of stacked laminations, a squirrel cage rotor winding embodied in said stacked laminations, a plurality of pole defining means formed in said stacked laminations, and a number of additional flux conducting laminations interleaved at intervals in said plurality of stacked laminations for diverting 5 to 15% of the motor flux to establish a cross-polar flux to provide armature reaction for speed stabilization of said synchronous machine.

3. A rotor adapted for use in a synchronous induction machine comprising a plurality of stacked laminations, a squirrel cage rotor winding embodied in said stacked laminations, a plurality of pole defining flux barriers formed in said stacked laminations, and means for diverting 5 to 15% of the motor flux comprising a number of laminations rotated out of alignment interleaved at intervals in said plurality of stacked laminations to provide a speed stabilizing cross-polar flux.

4. A rotor of the type described in claim 3, wherein said number of laminations rotated out of alignment interleaved at intervals is 5 to 15% of the laminations.

References Cited by the Examiner

UNITED STATES PATENTS

| | | | |
|---|---|---|---|
| 1,915,069 | 6/33 | Morrill et al. | 310—163 |
| 2,733,362 | 1/56 | Bauer et al. | 310—261 X |
| 2,769,108 | 10/56 | Risch | 310—265 |
| 2,913,607 | 11/59 | Douglas et al. | 310—211 X |
| 2,975,310 | 3/61 | Armstrong et al. | 310—211 X |
| 2,989,655 | 6/61 | Honsinger | 310—211 |
| 3,045,135 | 7/62 | Honsinger | 310—211 X |
| 3,047,755 | 7/62 | Angst et al. | 310—162 |

MILTON O. HIRSHFIELD, *Primary Examiner.*